United States Patent
Kim et al.

(10) Patent No.: US 8,537,101 B2
(45) Date of Patent: Sep. 17, 2013

(54) THREE-DIMENSIONAL IMAGE DISPLAY DEVICE

(75) Inventors: Yun-Jae Kim, Asan-si (KR); Byoung Jun Lee, Cheonan-si (KR); Kyung-Uk Choi, Asan-si (KR); Seung Hwan Moon, Asan-si (KR); Nam-Hee Goo, Asan-si (KR); Myoung-Chul Kim, Suwon-si (KR); Bo-Ram Kim, Asan-si (KR); Jong-Yoon Lee, Ansan-si (KR)

(73) Assignee: Samsung Display Co., Ltd. (KR)

( * ) Notice: Subject to any disclaimer, the term of this patent is extended or adjusted under 35 U.S.C. 154(b) by 224 days.

(21) Appl. No.: 13/173,283

(22) Filed: Jun. 30, 2011

(65) Prior Publication Data

US 2012/0126720 A1    May 24, 2012

(30) Foreign Application Priority Data

Nov. 19, 2010    (KR) ........................ 10-2010-0115670

(51) Int. Cl.
*G09G 3/36* (2006.01)
(52) U.S. Cl.
USPC ............... 345/102; 345/204; 348/51; 349/15; 359/464
(58) Field of Classification Search
USPC .................. 345/102, 204, 209, 419; 348/42, 348/51, 56; 349/15; 315/307; 359/464
See application file for complete search history.

(56) References Cited

U.S. PATENT DOCUMENTS

| | | | |
|---|---|---|---|
| 5,798,740 A | 8/1998 | Bitzakidis et al. | |
| 6,285,368 B1 | 9/2001 | Sudo | |
| 6,489,941 B1 | 12/2002 | Inage et al. | |
| 6,614,927 B1 | 9/2003 | Tabata | |
| 8,029,139 B2 * | 10/2011 | Ellinger et al. | 353/7 |
| 2007/0057905 A1 | 3/2007 | Johnson et al. | |
| 2007/0242068 A1 * | 10/2007 | Han et al. | 345/427 |
| 2008/0218452 A1 | 9/2008 | Kohno et al. | |
| 2008/0284719 A1 * | 11/2008 | Yoshida | 345/102 |
| 2010/0073465 A1 | 3/2010 | Park et al. | |
| 2010/0103089 A1 * | 4/2010 | Yoshida et al. | 345/102 |
| 2010/0141741 A1 | 6/2010 | Choi | |
| 2011/0018976 A1 * | 1/2011 | Park | 348/51 |
| 2011/0157332 A1 * | 6/2011 | Kim et al. | 348/56 |
| 2011/0175978 A1 * | 7/2011 | Ito | 348/43 |
| 2011/0234773 A1 * | 9/2011 | Koh et al. | 348/56 |
| 2011/0273480 A1 * | 11/2011 | Park et al. | 345/690 |
| 2012/0140035 A1 * | 6/2012 | Oh et al. | 348/43 |

FOREIGN PATENT DOCUMENTS

| | | |
|---|---|---|
| JP | 2001-134245 A | 5/2001 |
| JP | 2008-224864 A | 9/2008 |
| KR | 100331730 B1 | 3/2002 |
| KR | 100665942 B1 | 1/2007 |
| KR | 1020070037036 A | 4/2007 |
| KR | 1020100022653 A | 3/2010 |
| KR | 1020100064859 A | 6/2010 |

* cited by examiner

*Primary Examiner* — Joe H Cheng
(74) *Attorney, Agent, or Firm* — Cantor Colburn LLP

(57) ABSTRACT

A three-dimensional image display device includes a luminance controller receiving a three-dimensional enable signal, a backlight data signal and at least one starting signal of a scan starting signal, a vertical blank starting signal and a backlight starting signal. The luminance controller outputs a backlight control signal and a backlight unit is operated based on the backlight control signal and is coupled to the luminance controller. The backlight data signal is based on a previous pulse of the starting signal and is applied from a first time when a current pulse of the starting signal starts to a second time when a next pulse of the starting signal starts.

20 Claims, 13 Drawing Sheets

THREE-DIMENSIONAL IMAGE DISPLAY DEVICE

This application claims priority to Korean Patent Application No. 10-2010-0115670, filed on Nov. 19, 2010, and all the benefits accruing therefrom under 35 U.S.C. 119, the content of which in its entirety is herein incorporated by reference.

BACKGROUND OF THE INVENTION (a) Field of the Invention

This disclosure relates to a three-dimensional ("3D") image display device.

(b) Description of the Related Art

Human eyes are naturally placed at two slightly different locations. As human eyes see the world from these locations, images sensed by the eyes are often slightly different. This difference in the sensed images is generally called binocular parallax. Through an occurrence of this natural phenomenon, a user of a stereoscopic image display device is often able to view a 3D image at a short distance. For example, to show a 3D image, different two-dimensional ("2D") images are transmitted to a left eye and a right eye. When the image transmitted to the left eye ("left eye image") and the image transmitted to the right eye ("right eye image") are interpreted by the brain, the left eye image and the right eye image are combined in the brain to give the perception of a 3D depth.

A typical 3D image display device often uses the binocular parallax principle to display 3D images. Types of 3D image display devices include stereoscopic type devices, which often use shutter glasses and polarized glasses to display 3D images, and an autostereoscopic type devices, which are operated not by using glasses, but by arranging a lenticular lens and a parallax barrier in the display device in order to display a 3D image.

Generally, shutter glasses include a left eye shutter and a right eye shutter. Thus, during shutter glasses' operation, left eye images and right eye images are separately and continuously output and the left eye shutter and the right eye shutter are selectively opened and closed. The selective openings of the left eye shutter and the right eye shutter thereby creates an appearance of 3D images. Often, shutter glasses can be easily switched between a 2D mode and a 3D mode without any substantial data loss.

BRIEF SUMMARY OF THE INVENTION

An exemplary embodiment provides a three-dimensional image display device including a luminance controller receiving a three-dimensional enable signal, a backlight data signal and at least one starting signal of a scan starting signal, a vertical blank starting signal and a backlight starting signal. The luminance controller outputs a backlight control signal and a backlight unit is operated based on the backlight control signal and is coupled to the luminance controller. The backlight data signal is based on a previous pulse of the starting signal and is applied from a first time when a current pulse of the starting signal starts to a second time when a next pulse of the starting signal starts.

In an exemplary embodiment, the scan starting signal may include a first pulse informing a starting of every frame.

In an exemplary embodiment, the backlight data signal may be data of a bit unit and the backlight data signal is 0 or $2^{n-1}$, wherein n is a natural number.

In an exemplary embodiment, the vertical blank signal may include a first pulse and a second pulse informing a starting of a vertical blank.

In an exemplary embodiment, the backlight data signal based on the first pulse may be 0 and the backlight data signal based on the second pulse may be $2^{n-1}$, wherein n is a natural number.

In an exemplary embodiment, the backlight starting signal may include the first pulse and a third pulse and a timing of the third pulse may be earlier or later than the starting of the vertical blank.

In an exemplary embodiment, the backlight data signal based on the first pulse may be 0 and the backlight data signal based on the third pulse may be $2^{n-1}$, wherein n is a natural number.

In an exemplary embodiment, the backlight data signal may include any one of values from about 10 percent of $2^{n-1}$ to about 50 percent of $2^{n-1}$, wherein n is a natural number.

In an exemplary embodiment, the backlight data signal may be based on the first pulse.

In an exemplary embodiment, the luminance controller may be an off-duty type luminance controller.

In an exemplary embodiment, the backlight starting signal may include a fourth pulse and a timing of the fourth pulse may be earlier or later than the starting of the vertical blank.

In an exemplary embodiment, the backlight starting signal may be based on the fourth pulse.

In an exemplary embodiment, the luminance controller may be an on-duty type luminance controller.

In an exemplary embodiment, when the three-dimensional enable signal is in a high level, a magnitude in a current flowing in the backlight unit may be greater than the magnitude in a current flowing in the backlight unit when the three-dimensional enable signal is in a low level.

In an exemplary embodiment, the three-dimensional image display device may include a switching member including a first switch connected to a first resistor and a second switch connected to a second resistor and when the three-dimensional enable signal is in a high level, the first switch and the second switch may be turned-on.

In an exemplary embodiment, when the 3D enable signal is in a low level, the first switch may be turned-on and the second switch may be turned-off.

In an exemplary embodiment, the three-dimensional image display device may include a gate driver integrated into a display device alternately displaying a left eye image and a right eye image and the vertical blank signal may reset the gate driver.

In an exemplary embodiment, the gate driver may include a plurality of stages connected to each other and the plurality of stages may include a dummy stage and the vertical blank signal is applied to the dummy stage.

Exemplary embodiments of the present invention can substantially reduce power consumption of the backlight unit, effectively minimize luminance reduction of the display device as recognized through a shutter member, substantially reduce crosstalk between a left eye image and a right eye image and substantially reduce a load received by the gate driver of the three-dimensional image display device.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1:
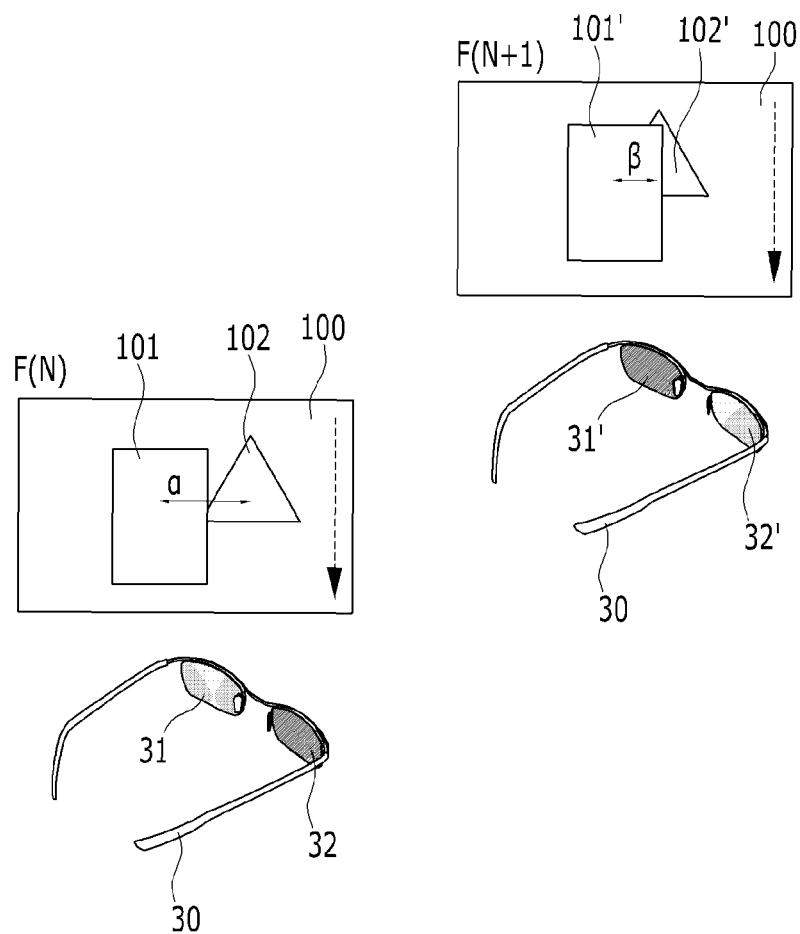
FIG. 1 is a diagram schematically showing an exemplary operation of an exemplary embodiment of a three-dimensional image display device according to the present invention.

The invention now will be described more fully hereinafter with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
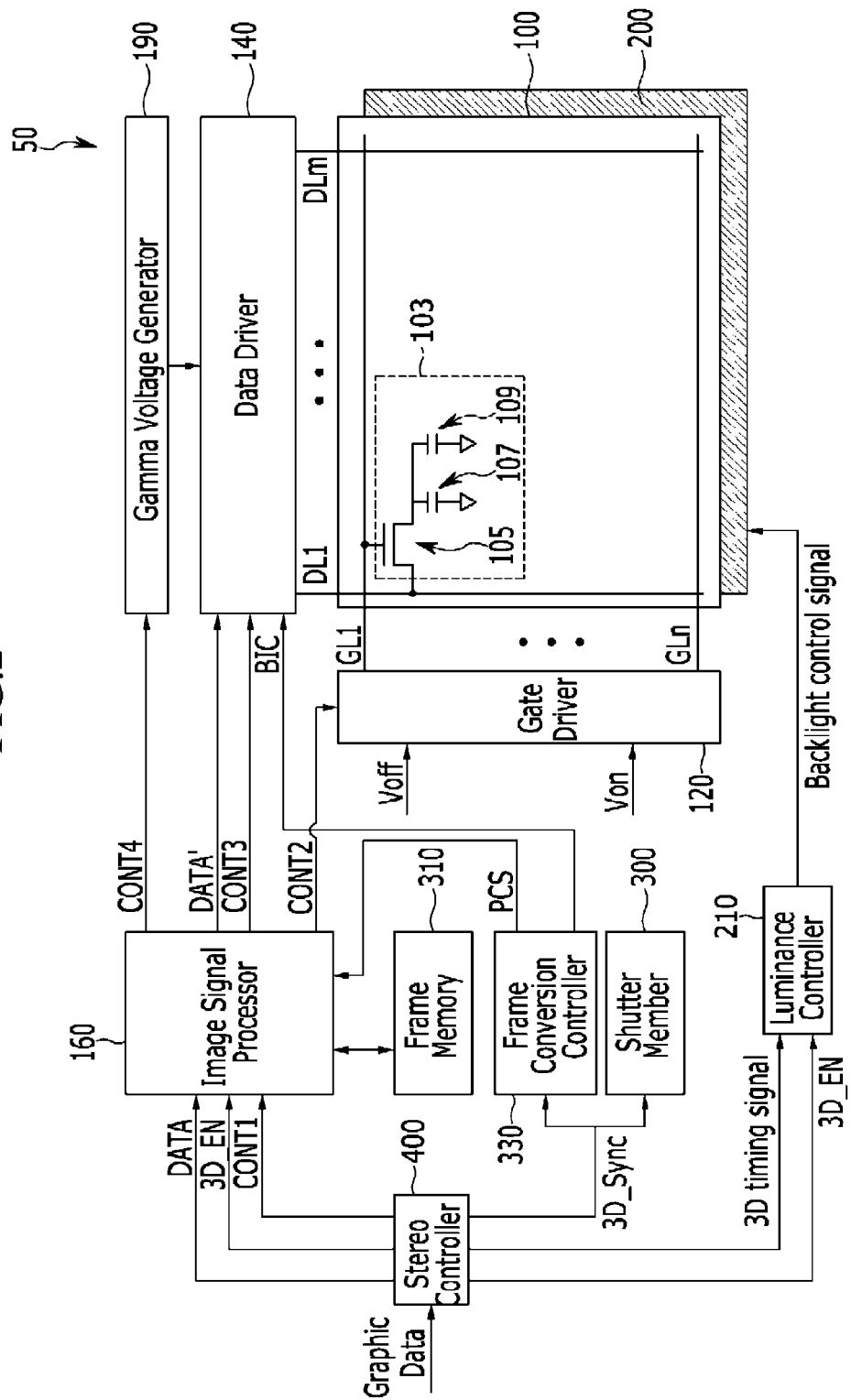
FIG. 2 is a diagram schematically showing an exemplary embodiment of a three-dimensional image display device according to the present invention.
Figure 3:
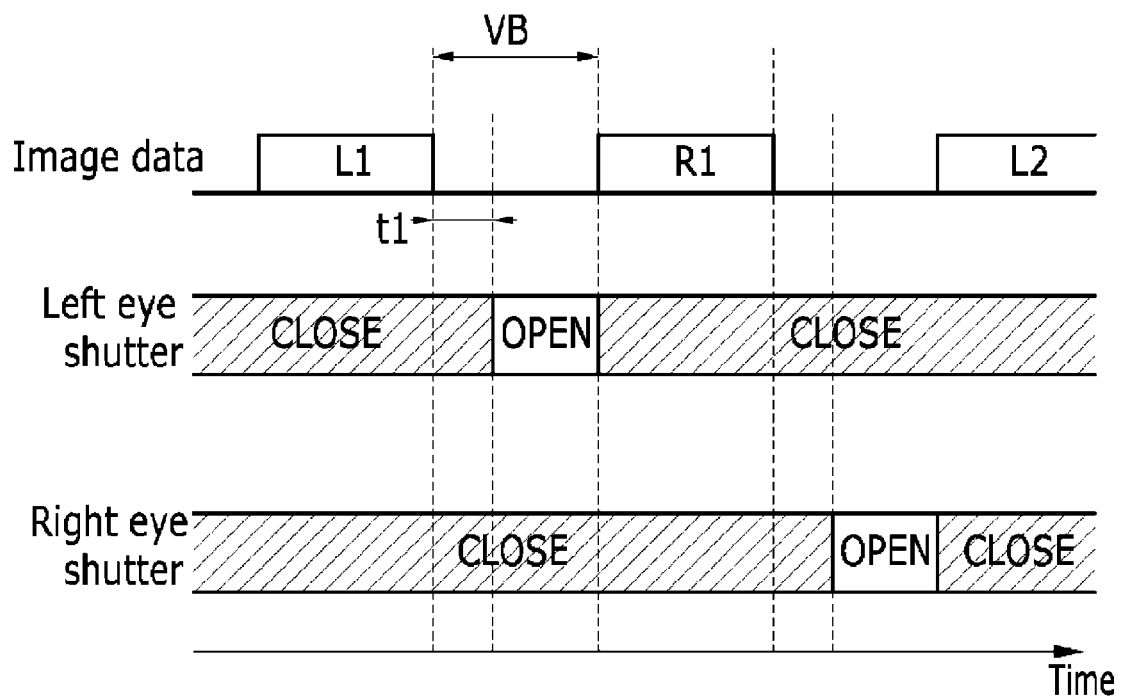
FIG. 3 is a diagram schematically showing an exemplary operational timing of a three-dimensional image display device according to the present invention.

With reference to FIGS. 1 to 3, an exemplary embodiment of a three-dimensional image display device is described.

FIG. 1 is a diagram schematically showing an exemplary operation of an exemplary embodiment of a three-dimensional image display device according to the present invention. FIG. 2 is a diagram schematically showing an exemplary embodiment of a three-dimensional image display device according to the present invention. FIG. 3 is a diagram schematically showing an exemplary operational timing of a three-dimensional image display device according to the present invention.

Referring to FIG. 1, a shutter member may be glasses-shaped shutter glasses 30. However, the shutter member is not limited thereto and may include mechanical shutter glasses ("goggles") and optical shutter glasses. The shutter glasses 30 include right eye shutters and left eye shutters, which alternately block light at a predetermined cycle via an operation of a display device 100. The right eye shutter may be closed 32 or open 32' and the left eye shutter may be open 31 or closed 31'. In an exemplary embodiment, during a time period, the left eye shutter may be closed, with the right eye shutter open, whereas during another time period, the right eye shutter may be closed, with the left eye shutter open. Further, both of the left eye shutter and the right eye shutter may be simultaneously open or closed.

The shutters of the shutter glasses 30 may often be formed by a technology used for a liquid crystal display, an organic light emitting diode display and an electrophoretic display, but not be limited thereto. In an exemplary embodiment, the shutters may include two transparent conductive layers and a liquid crystal layer positioned therebetween. A polarization film may be disposed on a surface of at least one of the conductive layers. Each shutter, via application of voltage to the liquid crystal layer, may alternately become dark or transparent.

An image transmitted to a left eye is a left eye image and an image transmitted to a right eye is a right eye image.

In an exemplary embodiment, left images 101 and 102 are output on the display device 100. The left eye shutter 31 of the shutter glasses 30 is open to transmit light and the right eye shutter 32 is closed to block light. Further, subsequently, right eye images 101' and 102' are output on the display device 100. The right eye shutter 32' of the shutter glasses 30 is open to transmit light and the left eye shutter 31' is closed to block light. Therefore, the left eye image is recognized by only the left eye for a predetermined time period and then the right eye image is recognized by only the right eye for the next predetermined time period, such that the brain recognizes a three-dimensional image having a depth by a difference between the left eye image and the right eye image.

The image recognized by the left eye is an image in which a quadrangle 101 and a triangle 102 are separated by a distance α from each other. The image recognized by the right eye is an image in which the quadrangle 101' and the triangle 102' are separated by a distance β from each other. The α and β may be different values. When the distances between the images recognized by both eyes have different values from each other, as described above, the quadrangles and the triangles have different distance perception due to the difference, such that the triangles are perceived to be positioned behind the quadrangles and depth perception occurs. In an exemplary embodiment, in order to adjust the distance (depth perception) between two objects spaced apart from each other, an adjustment of the distances α and β between the quadrangles and the triangles spaced apart from each other may be needed.

An image including a predetermined gray value may be displayed between the left eye images 101 and 102 and the right eye images 101' and 102'. In an exemplary embodiment, a black image, a white image and a gray image may be displayed. Crosstalk between the left eye images 101 and 102 and the right eye images 101' and 102' may decrease, when an image including a predetermined gray value is inserted in the entire screen of the display device 100.

Referring to FIG. 1, the direction of arrows in the display device 100 shows the order that gate-on voltage is applied to a plurality of gate lines extending substantially in the row direction. More particularly, the gate-on signal may be sequentially applied from the upper gate line to the lower gate line in the display device 100.

In an exemplary embodiment, the display device 100 may display the left eye images 101 and 102 by sequentially applying gate-on voltage to the gate lines such that a data voltage is applied to a pixel electrode through thin film transistors connected to corresponding gate lines. The applied data voltage is a data voltage for displaying the left eye images 101 and 102 ("left eye data voltage"). The applied left eye data voltage may be stored for a predetermined time period by a storage capacitor. Further, similarly, a data voltage for displaying the right eye images 101' and 102' ("right eye data voltage") is applied and may be stored for a predetermined time period by a storage capacitor.

Referring to FIG. 2, the display device 100 is a liquid crystal display. The display device 100 may include an upper substrate, a lower substrate and a liquid crystal layer injected between the upper substrate and the lower substrate. Via generation of an electric field between two electrodes, the display device 100 changes an alignment direction of the liquid crystal layer and controls transmittance of light, thereby displaying images.

The lower substrate is provided with gate lines GL1 to GLn, data lines DL1 to DLm, pixel electrodes and a thin film transistor 105 connected thereto. The thin film transistor 105 controls voltage applied to the pixel electrode based on a signal applied to the gate lines GL1 to GLn and the data lines DL1 to DLm. The pixel electrode may be formed of a transflective pixel electrode including a transmitting region and a reflecting region. In addition, a storage capacitance capacitor 107 may be further included. The storage capacitance capacitor 107 maintains the voltage applied to the pixel electrode for a predetermined time period. In an exemplary embodiment, one pixel 103 may include the thin film transistor 105, the storage capacitance capacitor 107 and a liquid crystal capacitance capacitor 109.

The upper substrate, which is opposite to the lower substrate, may be provided a black matrix, a color filter and a common electrode. In addition, at least one of the color filter, the black matrix and the common electrode formed on the upper substrate may also be formed on the lower substrate. When both the common electrode and the pixel electrode are formed on the lower substrate, then at least one of both electrodes may be formed in a linear electrode form.

The liquid crystal layer may include a twisted nematic ("TN") mode liquid crystal, a vertical alignment ("VA") mode liquid crystal and an electrically controlled birefringence ("ECB") mode liquid crystal.

An outer side surface of the upper substrate and an outer side surface of the lower substrate are each attached to a polarizer. In addition, a compensation film may be added between the substrates and the polarizer.

The backlight unit 200 includes a light source. An example of the light source is a fluorescent lamp, such as a cold cathode fluorescent lamp ("CCFL") and a light-emitting diode ("LED"). In addition, the backlight unit 200 may further include a reflector, a light guide and a luminance improve film.

Referring to FIG. 2, a display apparatus 50 may include the display device 100, the backlight unit 200, a data driver 140, a gate driver 120, an image signal processor 160, a gamma voltage generator 190, a luminance controller 210, a shutter member 300, a frame memory 310, a frame-converting controller 330 and a stereo controller 400.

The stereo controller 400 may transmit a three-dimensional ("3D") timing signal and a 3D enable signal 3D_EN to the luminance controller 210. The luminance controller 210 may transmit a backlight control signal to the backlight unit 200. The backlight unit 200 may be turned-on or turned-off via the backlight control signal through the luminance controller 210 and the stereo controller 400. The backlight control signal transmitted to the backlight unit 200 may turn-on the backlight unit 200 for a predetermined time period. In an exemplary embodiment, the backlight control signal transmitted to the backlight unit 200 may turn-on the backlight unit 200 for a vertical blank ("VB") or a time period other than the vertical blank.

The stereo controller 400 may transmit a 3D sync signal 3D_sync to the shutter member 300 and the frame-converting controller 330. The shutter member 300 may be electrically connected to the stereo controller 400. The shutter member 300 may receive the 3D sync signal 3D_sync via wireless infrared communication. The shutter member 300 may be operated in response to the 3D sync signal 3D_sync or a modified 3D sync signal. The 3D sync signal 3D_sync may include all the signals capable of opening and closing the left eye shutter or the right eye shutter. The frame-converting controller 330 may transmit control signals PCS and BIC o the image signal processor 160 and the data driver 140, respectively.

The stereo controller 400 may transmit a display data DATA, the 3D enable signal 3D_En and the other control signals CONT1 to the image signal processor 160. The image signal processor 160 may transmit various kinds of display data DATA' and various kinds of control signals CONT2, CONT3 and CONT4 to the display device 100, via the gate driver 120, the data driver 140, the gamma voltage generator 190, in order to display images on the display device 100. The display data DATA processed in the 3D image display device may include the left eye image data and the right eye image data.

With reference to FIGS. 1 and 3, left eye image data L1 and L2 and right eye image data R1 are input to the display device 100. As used herein, the image data corresponds to a signal represented by a digital and/or an analog format in order to output an image to the display device 100. Before all the left eye image data are input and the right eye image data are input or all the right eye image data are input and the left eye image data are input, there is a time period when the image data is not input. This time period is referred to as the VB. In an exemplary embodiment, the VB may be a time period from about 10 percent (%) to about 50% of a single frame time period, but is not limited thereto. Any one of the left shutters 31 and 31' and the right shutters 32 and 32' of the shutter glasses 30 can change to a close state CLOSE and the other thereof maintains an open state OPEN, for at least some time period of the VB. In FIG. 3, oblique portions of a left eye shutter and a right eye shutter rows correspond to the close state CLOSE. All the left eye shutters 31 and 31' and the right eye shutters 32 and 32' of the shutter glasses 30 may be in the close state CLOSE during the time period when the left eye image data or the right eye image data are input. In addition, all the left eye shutters 31 and 31' and the right eye shutters 32 and 32' of the shutter glasses 30 may be in the open state OPEN during the time period when the left eye image data or right eye image data are input.

If, after the input of the left eye image data or the right eye image data is completed, a predetermined time period t1 elapses, then the left eye shutters 31 and 31' or the right eye shutters 32 and 32' may be changed from the close state CLOSE to the open state OPEN. The predetermined time period t1 may be defined based on the response time of the liquid crystal of the display device 100. In an exemplary embodiment, after the input of the right eye image data R1 is completed due to the response time of the liquid crystal, the predetermined time period t1 is needed until the right eye images 101' and 102' are output. Therefore, after the predetermined time period t1 time elapses, the complete right eye image 101' and 102' may be viewed by opening the right eye shutters 32 and 32' and crosstalk, due to the previous image, may be effectively prevented.

In an exemplary embodiment, the backlight unit 200 is turned-on for at least some time of the VB and is turned-off for most time when the left eye image data or the right eye image data are input. This method of operation enables substantial reduction of power consumption of the display device 100. In an exemplary embodiment, the time point where the backlight unit 200 is first turned-on may be equal to the starting time point of the VB or may be later than the starting time point of the VB. In addition, the time point where the backlight unit 200 is finally turned-off may be equal to the ending time point of the VB or may be later than the ending time point of the VB. In addition, the backlight unit 200 may be repeatedly turned-on/off twice or more within the VB time period.

In addition, when the backlight unit 200 is turned-on for at least some time of the VB time period, a luminance of the backlight unit 200 may be larger than the luminance of the backlight unit 200 turned-on while a two-dimensional ("2D") image is displayed. Thus, substantial reduction of luminance of the display device 100, recognized through the shutter member 300, may be effectively minimized.

FIGS. 4 to 13 describe an exemplary embodiment of a detailed method for boosting the luminance of the backlight unit 200 for at least some time during the VB.

Figure 4:
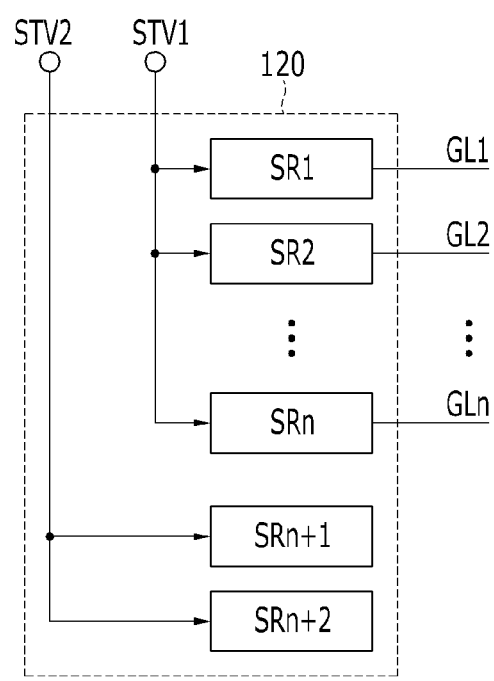
FIG. 4 is a diagram schematically showing an exemplary embodiment of a gate driver of a three-dimensional image display device according to the present invention.
Figure 5:
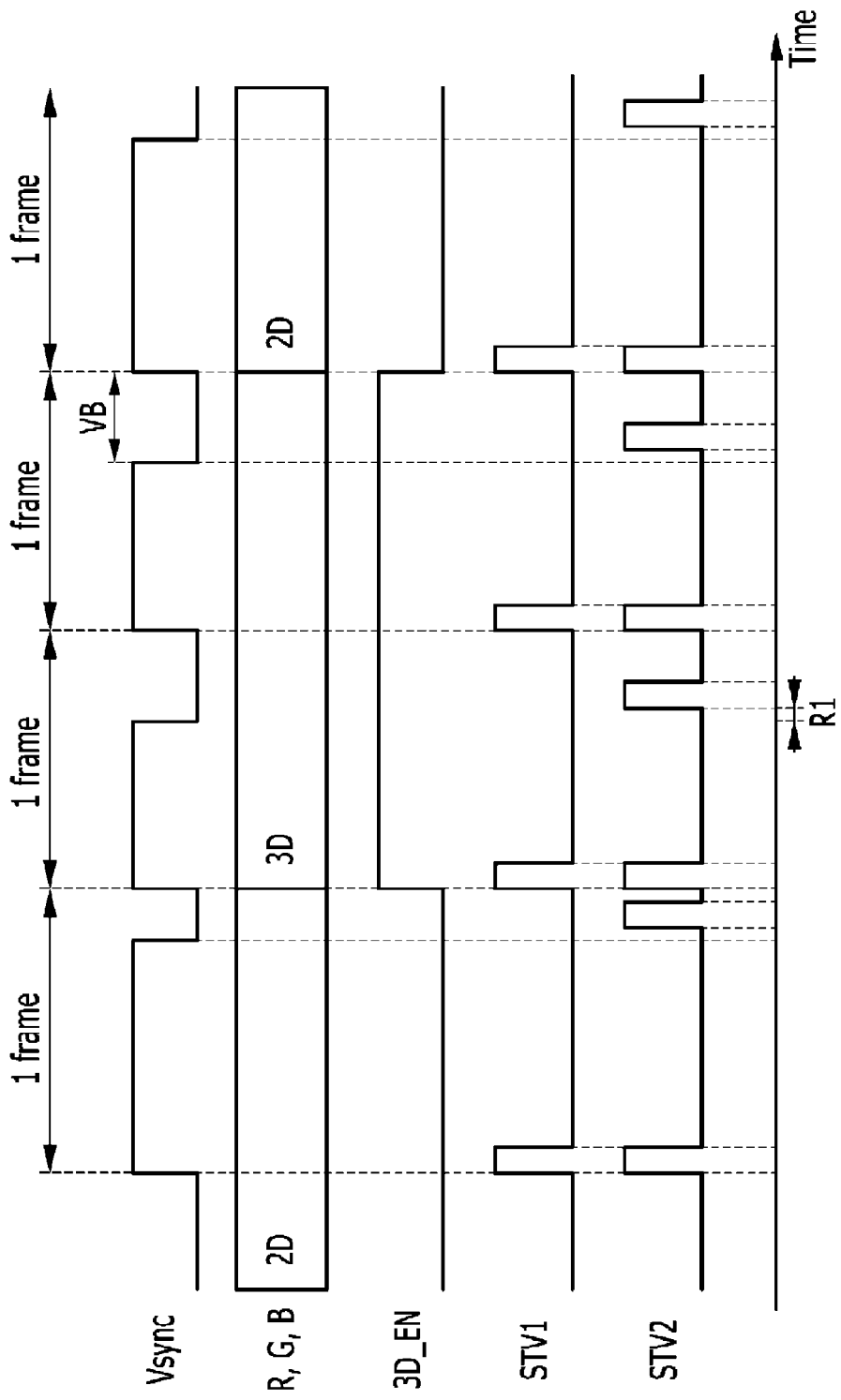
FIG. 5 is a diagram schematically showing another exemplary operational timing of a three-dimensional image display device according to the present invention.

FIG. 4 is a diagram schematically showing an exemplary embodiment of a gate driver of a three-dimensional image display device according to the present invention. FIG. 5 is a diagram schematically showing an exemplary operational timing of a three-dimensional image display device according to the present invention.

Referring to FIGS. 2 and 4, the gate driver 120 may be integrated in the display device 100 and may include a plurality of stages SR1 to SRn+2 dependently connected to each other. Each stage SR1 to SRn+2 may be applied with various control signals, such as CONT2, from the image signal processor 160. In an exemplary embodiment, with respect to the control signal CONT2, there are a scanning starting signal STV1 and a vertical blank starting signal STV2. In addition, the control signal CONT2 may include a clock signal and a low voltage signal.

An n-th stage SRn from a first stage is connected to the n-th gate line GLn from the first gate line GL1, thereby making it possible to apply the gate-on voltage. The plurality of stages SR1-SRn+2 are connected to each other, thereby making it possible to transmit and receive a transfer signal. An n+1-th stage SRn+1 and the n+2-th stage SRn+2 may be a dummy stage. The dummy stage is a stage that generates and outputs dummy gate voltage, unlike other stages SR1-SRn. More particularly, the dummy stage may not be connected to the gate lines. Alternatively, even though the dummy stage is connected to a gate line, it may be connected to the gate line of the dummy pixel so as not to display the images. The n+1-th stage SRn+1 and the n+2-th stage SRn+2 may be applied with the vertical blank starting signal STV2.

Referring to FIGS. 3 and 5, the scanning starting signal STV1 is a signal informing that the image data are input for every frame. The vertical blank starting signal STV2 is synchronized together with the scanning starting signal STV1 and may include a pulse synchronized with a pulse of the scanning starting signal STV1. In addition, the vertical blank starting signal STV2 may include a pulse informing the starting of the VB. Thus, the generated pulse informing the starting of the VB may be delayed by R1 from the VB starting time point. In an exemplary embodiment, R1 may be a time obtained by dividing 1 frame time by vertical resolution (n), but is not limited thereto. In addition, the vertical blank starting signal STV2 may be used as a signal resetting the gate driver 120. Since the left eye image data or the right eye image data may not be input for the VB, the gate driver 120 is reset based on the vertical blank starting signal STV2 for the VB, such that a load applied to a transistor included in each stage SR1-SRn+2 may be substantially reduced. Further, the backlight unit 200 may be turned-on or the left eye shutter or the right eye shutter may be opened and closed, based on the vertical blank starting signal STV2.

Referring to FIG. 5, 1 frame may be divided, based on a vertical synchronization signal Vsync. When the 3D enable signal 3D_EN is in a high level, the left eye image or the right eye image may be input. When the 3D enable signal 3D_EN is in a low level, the general 2D image may be input.

Figure 6:
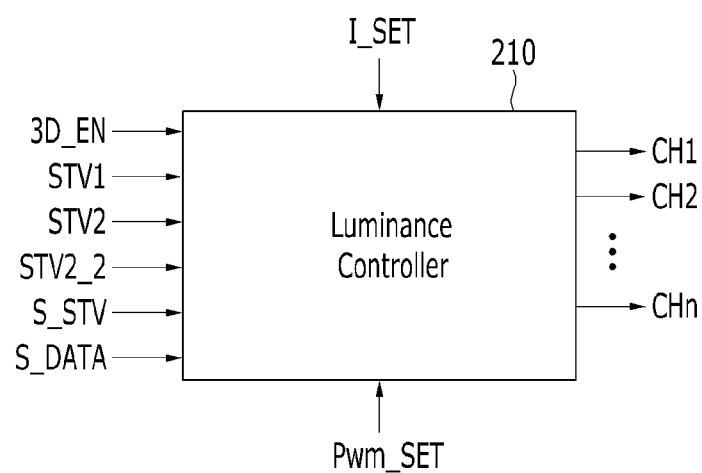
FIG. 6 is a diagram schematically showing an exemplary embodiment of a luminance controller of a three-dimensional image display device according to the present invention.

FIG. 6 is a diagram schematically showing an exemplary embodiment of a luminance controller of a three-dimensional image display device according to the present invention.

Referring to FIGS. 2, 5 and 6, the luminance controller 210 may receive the 3D enable signal 3D_EN, the scanning starting signal STV1, the vertical blank starting signal STV2, backlight starting signals S_STV and STV2_2, a backlight data signal S_DATA, a backlight current signal I_SET, a pulse width modulation signal PWM_SET and may output backlight control signals CH1-CHn for each channel. The signals may be generated in the image signal processor 160 and the stereo controller 400. The backlight unit 200 may be turned-on or off, based on the backlight control signals CH1-CHn. In an exemplary embodiment, the time period when the backlight unit 200 is turned-on, the time period when the backlight unit 200 is turned-off and the brightness of the backlight unit 200 can be controlled based on the backlight control signals CH1-CHn.

Figure 7:
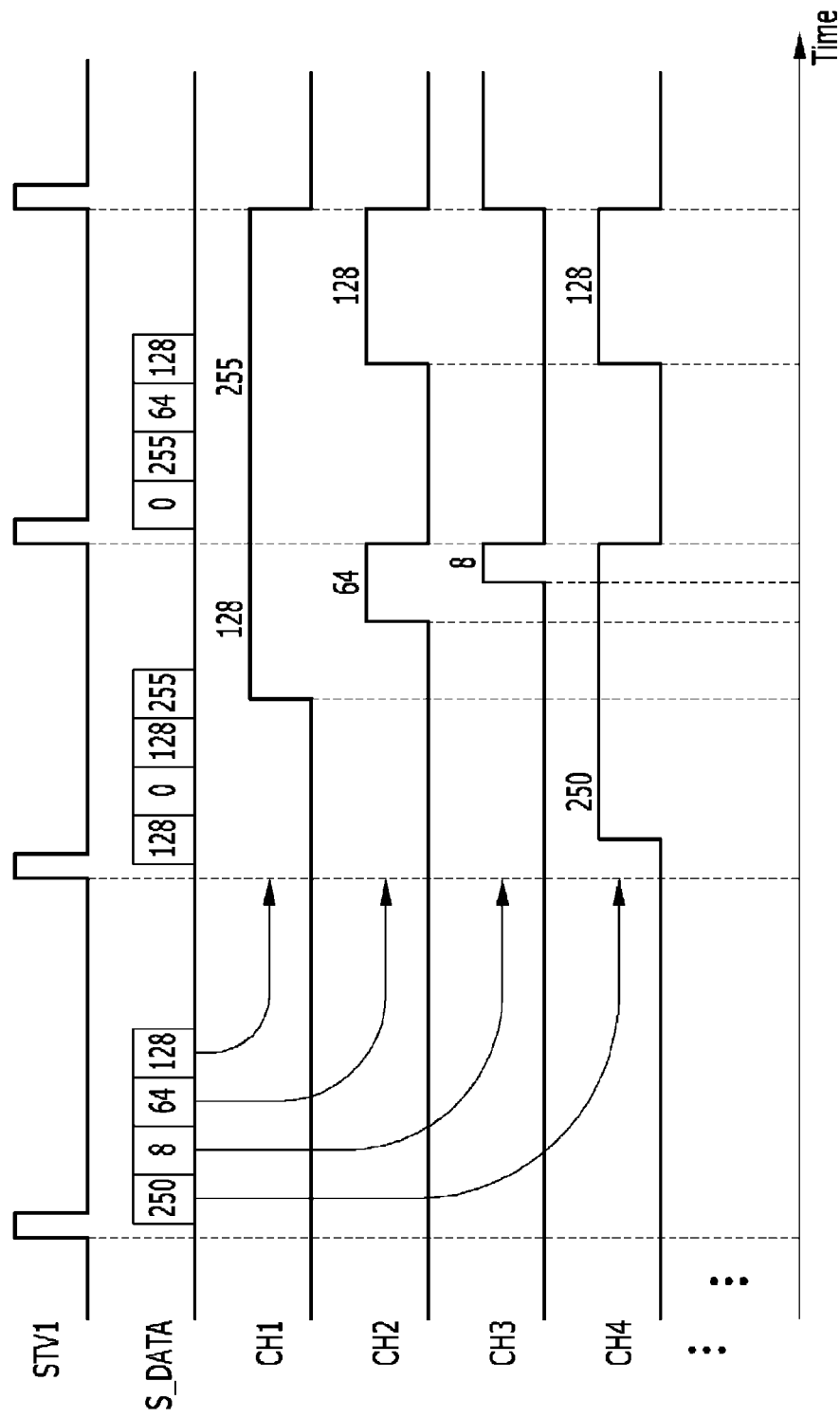
FIG. 7 is a diagram schematically showing an exemplary operational timing of a luminance controller of a three-dimensional image display device according to the present invention.
Figure 8:
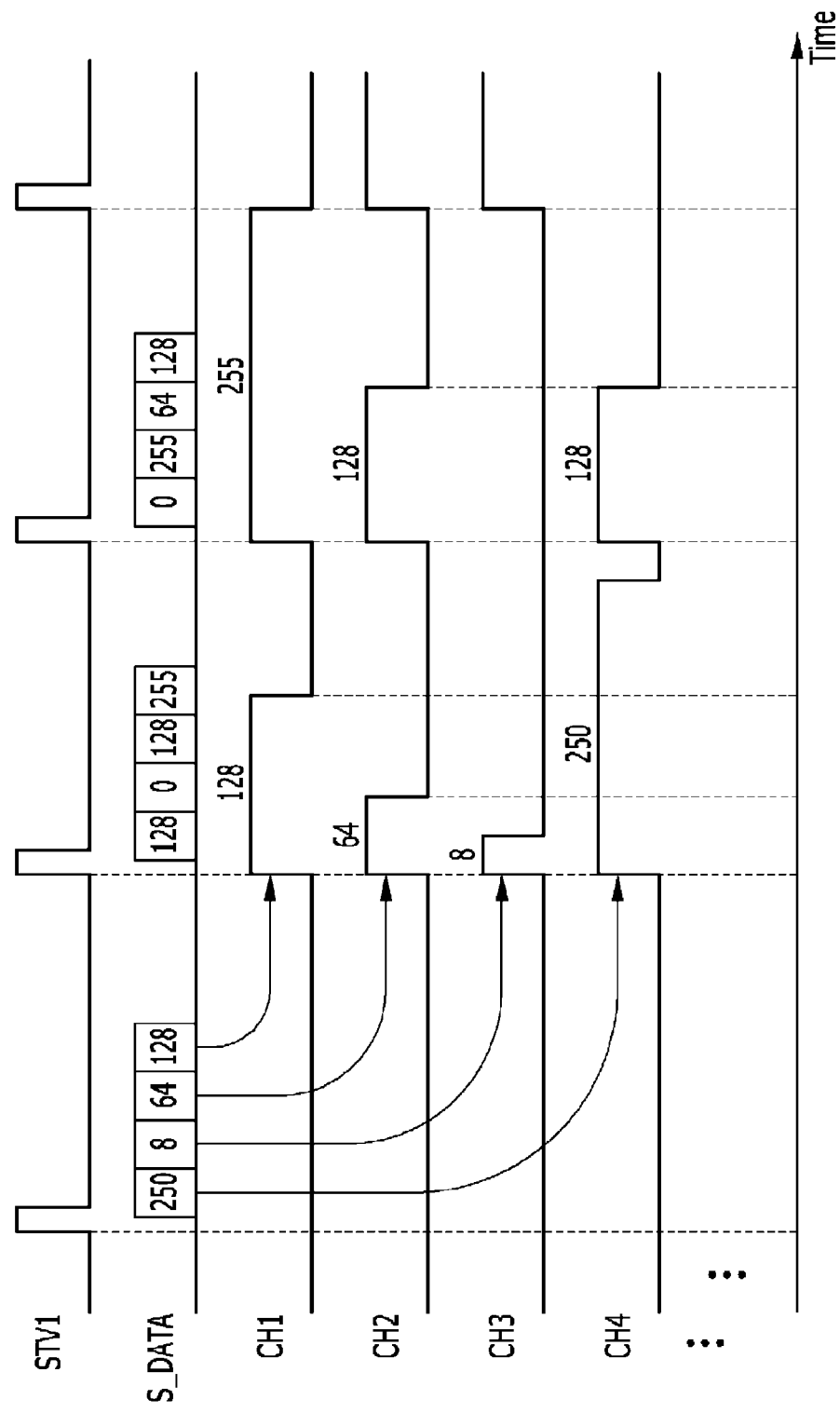
FIG. 8 is a diagram schematically showing another exemplary operational timing of a luminance controller of a three-dimensional image display device according to the present invention.

FIG. 7 is a diagram schematically showing an exemplary operational timing of a luminance controller of a three-dimensional image display device according to the present invention. FIG. 8 is a diagram schematically showing another exemplary operational timing of a luminance controller of a three-dimensional image display device according to the present invention.

Referring to FIGS. 2, 6 and 7, the backlight data signal S_DATA may have a value defining the turn-on time of the backlight unit 200, based on the scanning starting signal STV1. More particularly, the backlight data signal S_DATA may define a duty ratio of the backlight unit 200 for each channel of the backlight unit 200. The backlight data signal S_DATA may be applied when the next pulse of the scanning starting signal STV1 starts, based on the current pulse of the scanning starting signal STV1. In addition, the backlight data signal S_DATA based on the previous pulse of the scanning starting signal STV1 may be applied from the time when the current pulse of the scanning starting signal STV1 starts to the time when the next pulse of the scanning starting signal STV1 starts. When the backlight data signal S_DATA is data of a bit unit and the backlight data signal S_DATA is an n bit, the backlight data signal S_DATA may have a value from 0 to $2^{n-1}$ (n is a natural number). In an exemplary embodiment, when the backlight data signal S_DATA is 8 bit data, the backlight data signal S_DATA may have a value from 0 to 255. More particularly, when the backlight data signal S_DATA based on the previous pulse of the scanning starting signal STV1 is 255, the backlight unit 200 may be continuously turned-on from the time when the current pulse of the scanning starting signal STV1 starts to the time when the next pulse of the scanning starting signal STV1 starts. When the backlight data signal S_DATA based on the previous pulse of the scanning starting signal STV1 is 0, the backlight unit 200 may be continuously turned-off from the time when the current pulse of the scanning start signal STV1 starts to the time when the next pulse of the scanning starting signal STV1 starts. When the backlight data signal S_DATA is 128, the backlight unit 200 may be turned-on for an approximate 50% time for 1 frame time. When the backlight data signal S_DATA is 64, the backlight unit 200 may be turned-on for about 25% time of 1 frame time period.

Referring to FIG. 7, the luminance controller 210 may be an on-duty type luminance controller. The on-duty type luminance controller means that the luminance controller 210 changes a signal from a low level to a high level for 1 frame time period. In an exemplary embodiment, when the backlight data signal S_DATA is 64 in the current frame, the turn-off time is a time of about 75% of 1 frame time period and the turn-on time is a time period of an about 25% of 1 frame time period, when the backlight unit 200 is changed from a turn-off to turn-on state in the next frame.

Referring to FIGS. 2 and 6 to 8, an off-duty type luminance controller is disclosed. The off-duty type luminance controller means that a luminance controller changes a signal from a high level to a low level for 1 frame time. In an exemplary embodiment, when the backlight data signal S_DATA is 64 in the current frame and when the backlight unit 200 is changed from a turn-on state to a turn-off state in the next frame, the turn-on time is a time of about 25% of 1 frame time period and the turn-off time is a time of about 75% of 1 frame time period.

Figure 9:
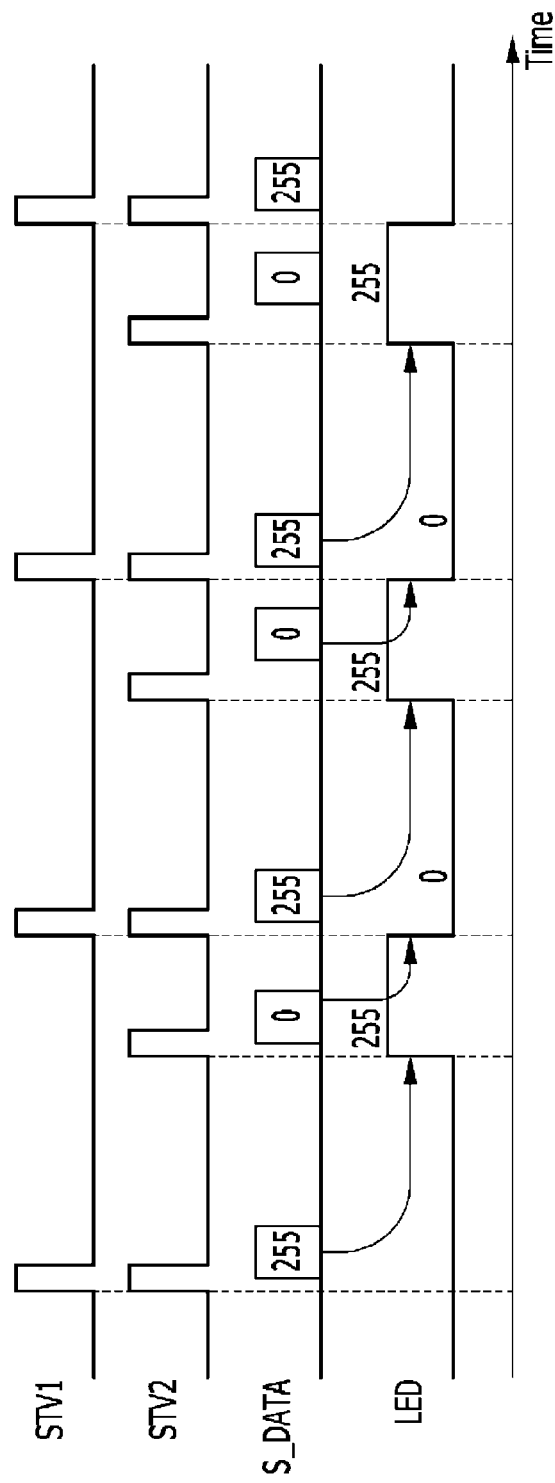
FIG. 9 is a diagram schematically showing an exemplary operational timing of a backlight of a three-dimensional image display device according to the present invention.
Figure 10:
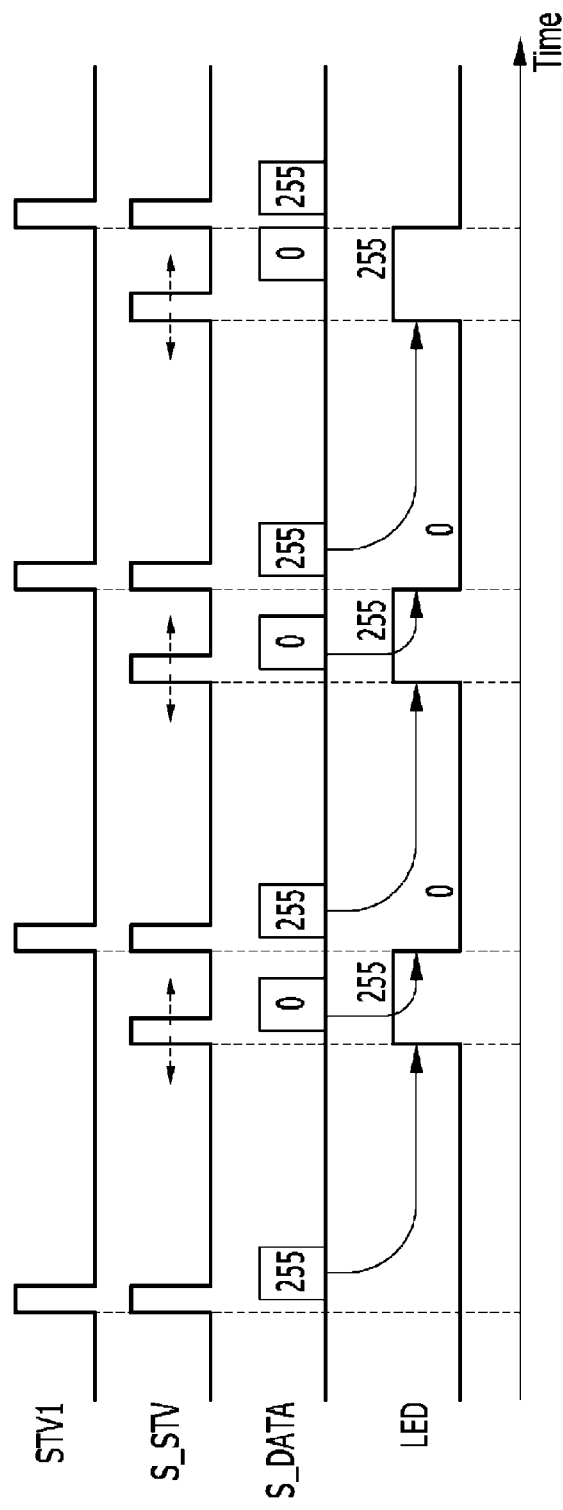
FIG. 10 is a diagram schematically showing another exemplary operational timing of a backlight of a three-dimensional image display device according to the present invention.

FIG. 9 is a diagram schematically showing an exemplary operational timing of a backlight of a three-dimensional image display device according to the present invention. FIG. 10 is a diagram schematically showing another exemplary operational timing of a backlight of a three-dimensional image display device according to the present invention.

Referring to FIGS. 2, and 6 to 9, the backlight data signal S_DATA may have a value controlling an operation time of the backlight unit 200 based on the vertical blank starting signal STV2. In an exemplary embodiment, when the backlight data signal S_DATA is 8-bits, the backlight data signal S_DATA may have a value of 0 or 255 for all the channels of the backlight unit 200. More particularly, the backlight data signal S_DATA may have a value based on the pulse of the vertical blank starting signal STV2. The backlight data signal S_DATA based on the current pulse of the vertical blank starting signal STV2 may be applied when the next pulse of the vertical blank starting signal STV2 starts. The backlight data signal S_DATA based on the previous pulse of the vertical blank starting signal STV2 may be applied from the time when the current pulse of the vertical blank starting signal STV2 starts to the time when the next pulse of the vertical blank starting signal STV2 starts. In an exemplary embodiment, when the backlight data signal S_DATA based on the previous pulse of the vertical blank starting signal STV2 is 255, the backlight unit 200 may be continuously turned-on from the time when the current pulse of the vertical blank starting signal STV2 starts to the time when the next pulse of the vertical blank starting signal STV2 starts. Further, when the backlight data signal S_DATA based on the current pulse of the vertical blank starting signal STV2 is 0, the backlight unit 200 may be continuously turned-off from the time when the next pulse of the vertical blank starting signal STV2 starts to the time when the next pulse of the vertical blank starting signal STV2 starts. The operating timing shown in FIGS. 8 and 9 may be identically applied to an on-duty type luminance controller and an off-duty type luminance controller.

Referring to FIG. 10, the backlight data signal S_DATA may have a value controlling an operation time of the backlight unit 200 based on the backlight starting signal S_STV. The backlight starting signal S_STV is synchronized together with the scan starting signal STV1 and may include a pulse synchronized with the pulse of the scanning starting signal STV1. In addition, the backlight starting signal S_STV may include a pulse pulsating prior to or after the pulse informing of the starting of the VB of the vertical blank starting signal STV2. Thus, the time difference prior to and after the pulse informing the starting of the VB of the vertical blank starting signal STV2 may be properly controlled. More particularly, the backlight data signal S_DATA may have a value based on the pulse of the backlight starting signal S_STV. Thus, when the backlight data signal S_DATA is 8-bit, the backlight data signal S_DATA may have a value of 0 or 255 for all the channels of the backlight unit 200. The backlight data signal S_DATA based on the current pulse of the backlight starting signal S_STV may be applied when the next pulse of the backlight starting signal S_STV starts. The backlight data signal S_DATA based on the previous pulse of the backlight starting signal S_STV may be applied from the time when the current pulse of the backlight starting signal S_STV starts to the time when the next pulse of the backlight starting signal S_STV starts. In an exemplary embodiment, when the backlight data signal S_DATA based on the previous pulse of the backlight starting signal S_STV is 255, the backlight unit 200 may be continuously turned-on from the time when the current pulse of the backlight starting signal S_STV starts to the time when the next pulse of the backlight starting signal S_STV starts. Further, when the backlight data signal S_DATA based on the current pulse of the backlight starting signal S_STV is 0, the backlight unit 20 may be continuously turned-off from the time when the next pulse of the backlight starting signal S_STV starts to the time when the next pulse of the backlight starting signal S_STV starts. The operating timing shown in FIG. 9 may be identically applied to an on-duty type luminance controller and an off-duty type luminance controller.

Figure 11:
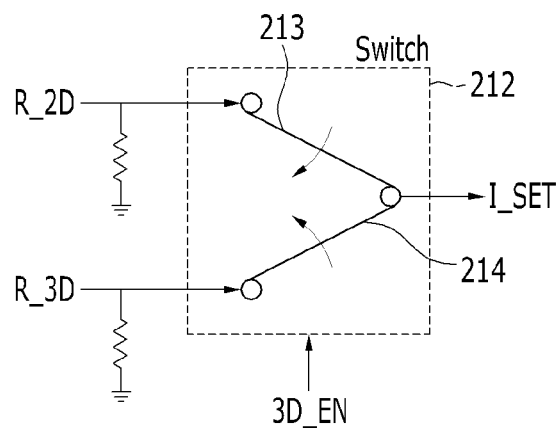
FIG. 11 is a diagram schematically showing an exemplary embodiment of a switching member of a three-dimensional image display device according to the present invention.

FIG. 11 is a diagram schematically showing an exemplary embodiment of a switching member of a three-dimensional image display device according to the present invention.

FIGS. 2, 6 and 11 show a switching member 212 boosting the backlight unit 200 by increasing current flowing in the backlight unit 200. The switching member 212 may include a first switch 213 connected to a first resistor R_2D and a second switch 214 connected to a second resistor R_3D. The first switch 213 and the second switch 214 are each turned-on when the 3D enable signal 3D_EN is in a high level. When the 3D enable signal 3D_EN is in a low level, the first switch 213 is turned-on and the second switch 214 is turned-off. In this instance, the 3D enable signal 3D_EN in a high level corresponds to the 3D image mode and the 3D enable signal 3D_EN in a low level corresponds to a 2D image mode. When two resistors are coupled in parallel, a synthesis resistance is substantially reduced, such that the resistance at the 3D image mode is smaller than the resistance at the 2D image mode. As a result, the magnitude in a backlight current signal I_SET at the 3D image mode may be larger than that of the backlight current signal I_SET at the 2D image mode. In addition, by changing the resistance value connected to the pulse width modulation signal PWM_SET, the amount of current flow in the backlight unit 200 may be controlled.

Figure 12:
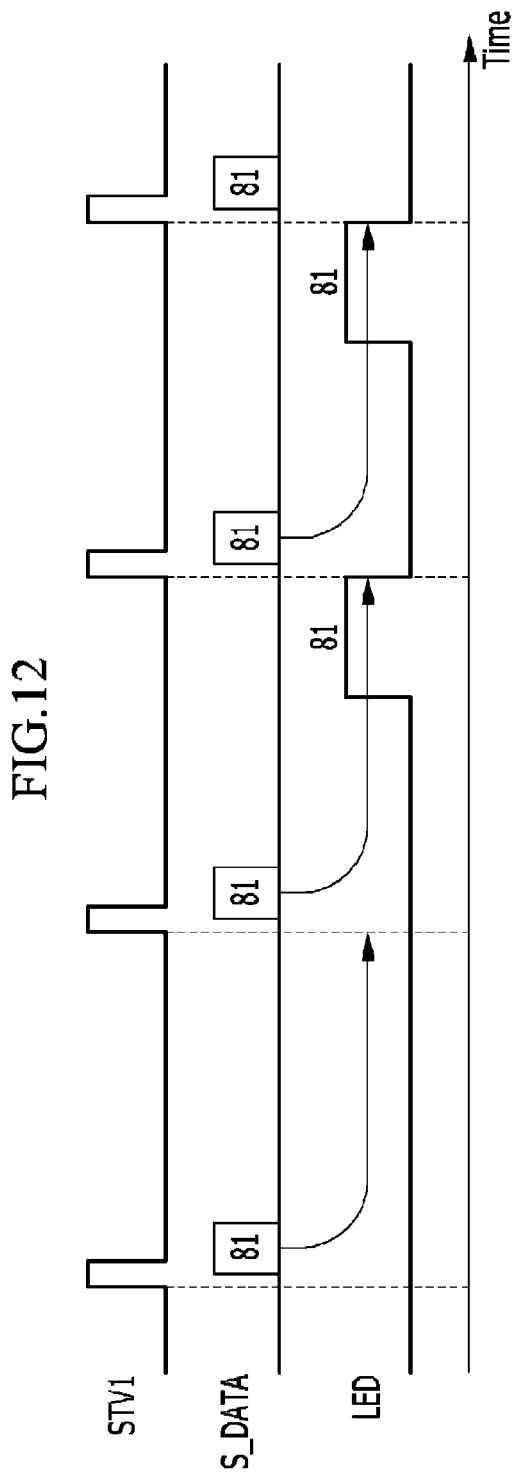
FIG. 12 is a diagram schematically showing another exemplary operational timing of a backlight of a three-dimensional image display device according to the present invention.

FIG. 12 is a diagram schematically showing another exemplary operational timing of a backlight of a three-dimensional image display device according to the present invention.

A skilled artisan can appreciate from viewing FIG. 12 that in an off-duty type luminance controller, the backlight data signal S_DATA is generated based on the scan starting signal STV1. Accordingly, the disclosure and description of FIG. 7 may be similarly applied. In an exemplary embodiment, the backlight data signal S_DATA may be 81 in all the channels of the backlight unit, but is not specifically limited thereto. Thus, when the backlight data signal S_DATA is 8 bits, 81 is a value corresponding to about 32% of 1 frame time period. More particularly, VB may be disposed before every frame based on the scan starting signal STV1 starts and the backlight unit 200 may be turned-on for VB. Further, instead of 81, the data signal S_DATA of the backlight unit 200 may have any one value in the range from about 10% to about 50% of $2^{n-1}$ (n is a natural number).

Figure 13:
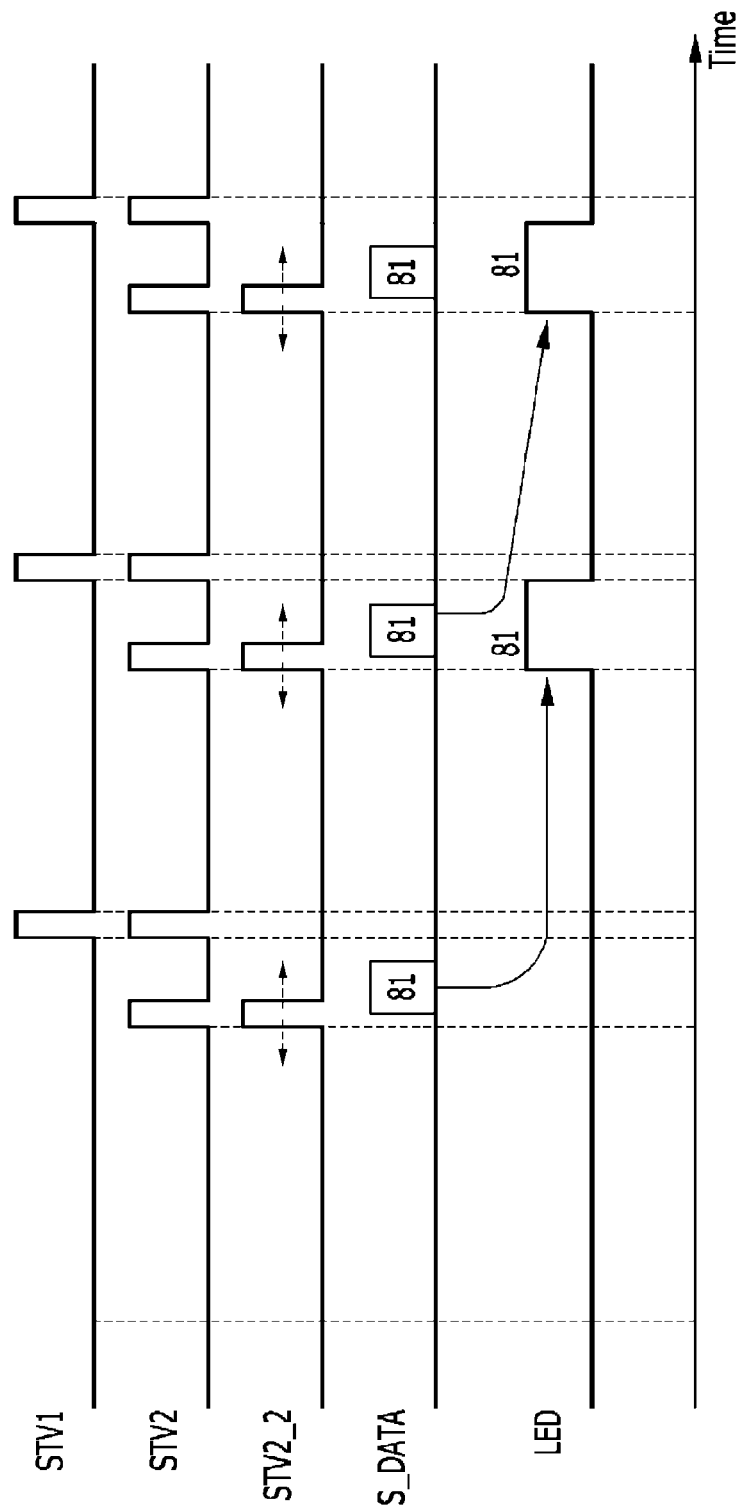
FIG. 13 is a diagram schematically showing another exemplary operational timing of a three-dimensional image display device according to the present invention.

FIG. 13 is a diagram schematically showing another exemplary operational timing of a three-dimensional image display device according to the present invention.

Referring to FIG. 13, a skilled artisan can appreciate that in an on-duty type luminance controller, the backlight data signal S_DATA is generated based on the backlight starting signal STV2_2. The backlight starting signal STV2_2 may include a pulse synchronized with the pulse informing the starting of VB of the vertical blank starting signal STV2 or a pulse pulsating prior to or after a pulse informing the starting of VB of the vertical blank starting signal STV2. Thus, the time difference prior to and after the pulse informing the starting of VB of the vertical blank starting signal STV2 may be properly controlled.

The backlight data signal S_DATA based on the previous pulse of the backlight starting signal STV2_2 may be applied from the time when the current pulse of the backlight starting signal STV2_2 starts to the time when the next pulse of the backlight starting signal STV2_2 starts. In an exemplary embodiment, when the backlight data signal S_DATA is 8 bits, the backlight data signal S_DATA in all the channels of the backlight may be 81. The backlight is turned-on for about 32% of 1 frame time period and may be then turned-off for about 68% of 1 frame time period.

In addition, the backlight data signal S_DATA may be generated based on the pulse informing the starting of the vertical blank of the vertical blank starting signal STV2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A three-dimensional image display device, comprising:
a luminance controller which receives a three-dimensional enable signal, a backlight data signal and at least one starting signal of a scan starting signal, a vertical blank starting signal and a backlight starting signal, and outputs a backlight control signal; and
a backlight unit operated based on the backlight control signal and coupled to the luminance controller,
wherein the control signal applied from a first time when a current pulse of the starting signal starts to a second time when a next pulse of the starting signal starts is based on the backlight data signal corresponding to a previous pulse of the starting signal.

2. The three-dimensional image display device of claim 1, wherein:
the scan starting signal comprises a first pulse informing a starting of every frame.

3. The three-dimensional image display device of claim 2, wherein:
the backlight data signal is data of a bit unit and the backlight data signal is 0 or $2^{n-1}$, wherein n is a natural number.

4. The three-dimensional image display device of claim 3, wherein:
the vertical blank starting signal comprises a first pulse and a second pulse informing a starting of a vertical blank.

5. The three-dimensional image display device of claim 4, wherein:
the backlight data signal based on the first pulse is 0 and the backlight data signal based on the second pulse is $2^{n-1}$, wherein n is a natural number.

6. The three-dimensional image display device of claim 3, wherein:
the backlight starting signal comprises the first pulse and a third pulse and a timing of the third pulse is earlier or later than the starting of a vertical blank.

7. The three-dimensional image display device of claim 6, wherein:
the backlight data signal based on the first pulse is 0 and the backlight data signal based on the third pulse is $2^{n-1}$, wherein n is a natural number.

8. The three-dimensional image display device of claim 2, wherein:
the backlight data signal includes any one of values from about 10 percent of $2^{n-1}$ to about 50 percent of $2^{n-1}$, wherein n is a natural number.

9. The three-dimensional image display device of claim 8, wherein:
the backlight data signal is based on the first pulse.

10. The three-dimensional image display device of claim 9, wherein:
the luminance controller is an off-duty type luminance controller.

11. The three-dimensional image display device of claim 8, wherein:
the backlight starting signal comprises a fourth pulse and a timing of the fourth pulse is earlier or later than a starting of a vertical blank.

12. The three-dimensional image display device of claim 11, wherein:
the backlight starting signal is based on the fourth pulse.

13. The three-dimensional image display device of claim 12, wherein:
the luminance controller is an on-duty type luminance controller.

14. The three-dimensional image display device of claim 1, wherein:
a magnitude in a current flowing in the backlight unit when the three-dimensional enable signal is in a high level is greater than the magnitude in a current flowing in the backlight unit when the three-dimensional enable signal is in a low level.

15. The three-dimensional image display device of claim 14, wherein:
the three-dimensional image display device comprises a switching member comprising a first switch connected to a first resistor and a second switch connected to a second resistor, and
when the three-dimensional enable signal is in a high level, the first switch and the second switch are turned-on.

16. The three-dimensional image display device of claim 15, wherein:
when the three-dimensional enable signal is in a low level, the first switch is turned-on and the second switch is turned-off.

17. The three-dimensional image display device of claim 1, further comprising a gate driver integrated into a display device alternately displaying a left eye image and a right eye image and
the vertical blank starting signal resets a gate driver.

18. The three-dimensional image display device of claim 17, wherein:
the gate driver comprises a plurality of stages connected to each other, the plurality of stages comprise a dummy stage and the vertical blank starting signal is applied to the dummy stage.

19. The three-dimensional image display device of claim 17, wherein:
a magnitude in a current flowing in the backlight unit when the three-dimensional enable signal is in a high level is greater than the magnitude in a current flowing in the backlight unit when the three-dimensional enable signal is in a low level.

20. The three-dimensional image display device of claim 19, further comprising a switching member comprising a first switch connected to a first resistor and a second switch connected to a second resistor, and
when the three-dimensional enable signal is in a high level, the first switch and the second switch are turned-on.

* * * * *